United States Patent [19]

Feldstein

[11] Patent Number: 5,339,873
[45] Date of Patent: Aug. 23, 1994

[54] CORED BATTERY PLATES FOR LEAD/ACID BATTERIES

[75] Inventor: Robert S. Feldstein, Pelham, N.Y.

[73] Assignee: Derafe, Ltd., Buffalo, N.Y.

[21] Appl. No.: 74,363

[22] Filed: Jun. 10, 1993

[51] Int. Cl.$^5$ .............................................. H01M 4/22
[52] U.S. Cl. ................... 141/1.001; 141/33; 141/32; 29/2; 429/232
[58] Field of Search ................... 29/2, 623.1, 623.2, 29/623.4, 623.5; 141/1.1, 33, 32; 429/223, 232

[56] References Cited

U.S. PATENT DOCUMENTS

| | | | |
|---|---|---|---|
| 4,338,978 | 7/1982 | Devitt et al. | 141/1.1 |
| 4,429,442 | 2/1984 | Thomas | 29/2 |
| 5,146,958 | 9/1992 | Bugnet et al. | 141/1.1 |
| 5,238,028 | 8/1993 | Imhof et al. | 141/1.1 |
| 5,244,758 | 9/1993 | Bronoel et al. | 429/223 |

FOREIGN PATENT DOCUMENTS 2550387  2/1985  France .............................. 141/1.1

OTHER PUBLICATIONS

XA-200: Proposed Hybrid Electric Vehicle . . . Lead Acid Battery (1991) Eskra et al; Johnson Controls Inc., *ISATA Conference Paper*, pp. 305–311.

*Design News*, Oct. 21, 1991; Electric Vehicle Race Gathers Momentum; Iverson.

Publisher unknown, data unknown; Fischetti; Here Comes The Electric Car . . . ; pp. 34–43.

*Popular Mechanics*, Sep. 1991; New Age EV; Shuldiner; pp. 27–29 & 102.

*Popular Mechanics*, Sep. 1991; Battery Chargers; Allen pp. 30, 31.

*Toronto Star*, Aug. 15, 1993; Batteries at GM . . . Run Down Fast Oscar Suris (Dow Jones).

*Primary Examiner*—Ernest G. Cusick
*Attorney, Agent, or Firm*—Beveridge, DeGrandi, Weilacher & Young

[57] ABSTRACT

Methods for fabricating cored structures are provided. The cored structures may particularly find usefulness as cored battery plates for use in lead/acid batteries. A pre-formed core element is provided, and on its surfaces there is placed a thin layer of an active surface material. That active surface material is one which may enter into a chemical or electrochemical process when in use and in the presence of an electrolyte or other agent which will promote such chemical or electrochemical process. In the case of lead/acid batteries, the active surface is lead or lead oxide. The core element is generally one which does not bond with the active surface material, but will if the active surface material is ion bombarded or neutral atom embedded into the surface of the core, and where the amount of bombardment or embedment is determined by controlling the accelerator voltage. A typical cored battery plate for lead/acid batteries will have titanium or other low resistivity metal, with titanium at its outer surface in any event, and with lead having been ion implanted onto the surface of the titanium until such time as an essentially pure lead surface is attained. Further lead may be placed using other methods until sufficient lead is present as to form the active lead surface. The lead may be subsequently oxidized.

11 Claims, No Drawings

CORED BATTERY PLATES FOR LEAD/ACID BATTERIES

FIELD OF THE INVENTION

This invention relates to methods for fabricating battery plates, particularly for use in lead/acid batteries. In use, particularly in lead/acid batteries, the plates have active surface areas of lead or lead oxide, and are exposed to sulphuric acid within the battery cell containment. The present invention is particularly directed to lead/acid batteries that may be used as the power source batteries in electric vehicles, or in other circumstances such as standby battery applications, where the plates are manufactured so as to have a cored plate structure.

BACKGROUND OF THE INVENTION

It is said that, in future, automotive transport will look much more closely to, and rely more upon, electrically powered vehicles. Electric vehicles are essentially zero-emission vehicles, which is to say that they are non-polluting at the power consumption point, and it is intended that current shortcomings of electrical vehicles should be overcome as quickly as possible. Among those shortcomings is the fact that batteries to be used for electric vehicles may comprise as much as 20% to 30% of the weight of the vehicle. That means, in turn, that the power delivered by the batteries must be such that it can move only the vehicle and its passengers, but the weight of the batteries themselves. Moreover, even in city and light highway traffic conditions, an electric vehicle must be expected to accelerate in a manner similar to a conventional vehicle powered by an internal combustion engine, which means either that there must be excess battery capacity on board the vehicle to provide fast current delivery for vehicle acceleration, or that the batteries must be designed with a high ratio of active material surface to volume so as to be able to provide high power densities. Such demands may be similar to cranking power requirements in ordinary vehicles, but the demands may occur much more frequently and be of longer duration in each instance.

Moreover, electrically powered vehicles must have batteries that are capable of being recharged very quickly. While battery recharging is outside the scope of this invention, it is evident that just as the batteries must be designed so as to be able to deliver high current, quickly, so also must they be designed to absorb high recharging current, quickly. Still further, the choice of batteries in various experimental and low-production electric vehicle programs currently under way throughout the world has demanded consideration of various battery types, operating at various voltage levels.

Among the battery types presently under consideration for use in electric vehicles are nickel-cadmium batteries, which however are very expensive, environmentally undesirable, and tend to self-discharge. Moreover, nickel-cadmium batteries may exhibit a memory effect, in that they must be substantially fully discharged before they are recharged; otherwise, such batteries may develop a rate-limited "memory" phenomenon whereby they tend to lose their usable rate delivery capabilities if they are recharged when only partially discharged.

Nickel-iron batteries are also being considered, but it must not be overlooked that they were used at least as early as the Second World War to power submarines when running under water. Moreover, nickel-iron batteries tend to produce hydrogen gas, requiring very special ventilation, and creating explosive conditions. Still further, they are very heavy.

Even rechargeable alkaline manganese dioxide batteries are now being considered for electric vehicles. Bundles of very small cells are being assembled into batteries so as to provide high current delivery and high current recharge acceptance characteristics, which overcomes a shortcoming of such batteries in commercial cell sizes because they are not generally capable of high current delivery or high current recharge. Batteries made from rechargeable alkaline manganese dioxide cells also overcome the shortcomings of similar nickel-cadmium batteries in that they do not have any memory effects, and are not nearly so likely to exhibit overheating characteristics, especially during recharge which is not precisely controlled. However, rechargeable alkaline manganese dioxide batteries are expected to be quite expensive in terms of the power density capable of being produced, and to have unacceptable cycle life.

Sodium-sulphur batteries will provide about three times the range of lead/acid batteries having the same weight. However, sodium-sulphur batteries must be maintained at temperatures of at least 315° C. in order to produce electricity, making them extremely hazardous in use. Moreover, to maintain sodium-sulphur batteries at those high temperatures requires extremely good insulation plus electrically powered heaters—which is wasteful of stored electrical energy in the battery, as well as making a requirement for external power when the vehicle is parked.

Accordingly, the automotive industry has generally decided to maintain its reliance on lead/acid batteries as a principal power source for electric vehicles, for a variety of reasons. First, lead/acid battery technology is well known and accepted by the public, since most automotive batteries are currently lead/acid batteries. Lead acid batteries are also well accepted as traction batteries for industrial vehicles such as fork lift trucks and the like, and for recreational vehicles such as golf carts. Moreover, lead/acid batteries can be designed to be essentially non-polluting if they are closed or sealed batteries operating in a gas recombinant mode. Such batteries require very little maintenance, if any. Still further, even the disposal of lead/acid batteries is less ecologically sensitive an issue than previously, because techniques now exist whereby substantially all lead in such batteries may be recovered and recycled. This reduces, if not virtually eliminates, landfill and ground water contamination problems.

Moreover, in general it is possible to design lead/acid batteries that are capable of delivering and receiving relatively high current densities, so as to meet the requirements of electric vehicle acceleration, regenerative braking, and fast charging. However, lead/acid batteries still have a number of problems to overcome, including the problems of energy density, and the unfortunate tendency of lead/acid batteries to lose active material from their plates—particularly at high current densities. If active material is lost from a plate, then obviously the current capacity of the battery will be reduced; and moreover, there exists a strong possibility that active material detaching from the plates may result in short-circuited cells.

All of the major automobile manufacturers of the world are devoting very substantial sums of money to the development of electric vehicles. Indeed, some of those electric vehicles are hybrids, which use small auxiliary power sources—such as a small gasoline engine—whose purpose is to charge the batteries of the vehicle—especially during long or extended trips taken by the vehicle. Unfortunately, at least in California, such vehicles may not be accepted after 1998 because it is mandated that after 1998 at least 2% of the vehicles sold in California by any manufacturer who sells more than 5,000 vehicles annually in that state must be zero-emission vehicles. That means that hybrid vehicles, while attractive, may only be a short-term solution towards fully electric vehicles—with the possible exception of hydrogen powered vehicles.

Regrettably, this once again raises the problem of the capability of lead/acid batteries to continually absorb deep discharge without degrading, especially over many cycles having rapid battery recharging.

Certain bipolar lead/acid batteries have been developed by Jet Propulsion Laboratory, in association with Johnson Controls Inc., particularly for the XA-100 and XA-200 hybrid electric vehicle projects. In a paper published in 1991 by Johnson Controls Inc., "The XA-200: Proposed Hybrid Electric Vehicle Using the Bipolar Lead/Acid Battery" by M. Eskra et al, bipolar lead/acid batteries are discussed. Hybrid vehicles incorporating the described batteries are driven using a three-phase AC induction motor and an inverter controller system, carried in the frame of a conventional automobile but replacing its engine. According to the Eskra et al paper, it was found in early experimentation that the lead/acid batteries needed to be optimized so as to operate under high power conditions, and that the lead/acid batteries were too large and too heavy. The battery requirements were for the battery to deliver 60 kW for 20 seconds, and to have about 7 kWh total energy capacity. The weight allowed is 365 Kg, thus providing for energy density of about 19.2 Whr/Kg. The battery voltage is now expected to be in the range of about 200 volts; and the cut-off voltage for the battery is set at 100 volts, after which the battery is recharged.

The Eskra et al paper was given at the ISATA conference, held in Florence, Italy, during May 1991. The paper describes a bipolar battery having positive and negative active surfaces that are mounted back-to-back on an electrically conductive substrate, with separators placed between the opposed electrode surfaces of opposite polarity. As with any bipolar battery, the current path is straight through the battery, and the voltage increases with each cell that the current passes through. The bipolar battery is made of a stack of bipolar plates, and the stack is created and sealed by thermally welding together the plastic edges that are formed on each of the bipolar plates. It must be noted that each plate consists of a reinforced plastic substrate, with two thin lead grids on either side of the substrate, and having active material pasted into the grids. Electric current is carried through the reinforced plastic substrate by physical connections that are made between the thin lead grids which are on either side. The battery operates in a sealed, gas recombinant mode, with oxygen that is produced at the positive electrode or positive side of each plate diffusing to the negative electrode or side of the adjacent plate, where it is reduced.

It should be noted, as well, that lead/acid batteries in keeping with the present invention may find usefulness in other circumstances than electrically powered vehicles. In particular, lead/acid batteries in keeping with the present invention will provide suitable high levels of energy density and power density, long cycle life and fast recharging rates, all of which are critical or particularly attractive for utilization of the batteries in electric vehicles. Moreover, because of those characteristics, it will also follow that for given parameters any lead/acid batteries of the present invention may have a smaller footprint or volume, lower weight, and longer float life, all of which are critical or at least desirable for circumstances such as standby power applications. Such uses may include uninterruptable power supplies, and other standby and/or critical load power systems.

It was noted above that the Eskra et al paper describes bipolar lead/acid batteries that are capable of providing energy densities of about 19.2 Whr/Kg. Lead/acid batteries in keeping with the present invention will provide at least three times that energy density—with an ultimate capacity in the range of 110 Whr/Kg—and bipolar batteries as described and noted hereafter will provide up to 110 Whr/Kg.

Indeed, a variety of related inventions that are all directed towards battery plates for lead/acid batteries are described or at least referenced, below. Several issues, therefore, to be discussed include the provision of battery plates for lead/acid batteries, wherein an increased exposed active surface area for each plate, with respect to its projected area, will be provided. Thus, battery plates in keeping with the present invention are more capable of providing high current rates, from which it follows that battery plates as provided herein will exhibit a high active material surface to volume ratio. Conversely, such battery plates provide a lower density per unit of active area of the battery plates. The exposed active surface area of the plate will be at least 150% of its projected area.

Reference will be made herein to the provision of battery plates whereby various surface treatment steps may be taken to provide for the increased active surface area. Thus, steps are described to provide the placement of lead, and the manner in which the lead surface may be worked or machined so as to provide an increased active surface area.

Moreover, the present discussion is also directed to methods whereby positive battery plates may be provided by providing for oxidation of a prepared lead surface. There is therefore a fully prepared positive plate or positive plate surface that is provided, and from that it follows that a formed battery will be provided when prepared negative lead plates and positive lead oxide plates are placed together with the appropriate confinement structures, electrolyte, etc. This therefore precludes any requirement for formation of positive battery plates after the battery has been manufactured, so that a manufactured battery is immediately ready to be placed in service without the necessity for post-assembly formation.

A principal purpose of the present invention is the provision of cored battery plates for lead/acid batteries. By providing a cored battery plate, where the core may be such as titanium, copper, chromium steel, or even silver, not only will the weight of the battery plate be reduced compared with battery plates that are comprises solely of lead or at least that have a lead supporting structure, battery plates will be provided by the present invention that have a higher current handling capability during charge and discharge.

It should be noted that the teachings of the present invention, especially as they may relate to cored battery plates, may be applied to the provision of bipolar batteries. Moreover, it will be evident that the methods of surface preparation, and methods of oxide formation, will be equally applicable to bipolar plates.

The present invention provides cored battery plates for lead/acid batteries, in particular, and thus it will provide bipolar plates for lead/acid batteries. Moreover, the present invention will provide battery plates which are quite thin as to their lead constituent, but which comprise little additional structure which would otherwise add weight without providing either structural integrity or current density capabilities. Of even greater significance is the fact that battery plates that are fabricated according to the methods of the present invention will not exhibit any tendency to delaminate.

It should also be noted that the present invention is not specifically restricted or limited to lead/acid batteries. Thus, the present invention may also be applicable to other battery systems where a cored plate structure may be particularly useful for purposes such as plate support or current collection. Still further, the present invention may be applicable to bicomponent structures in general, where it is necessary to surface treat the structure by embedding therein atoms of another element for such purposes as inhibition of corrosion.

OBJECTS OF THE INVENTION

Accordingly, it is an object of the present invention to provide methods for fabricating cored structures such as battery plates for use in lead/acid batteries. Particularly in the case of lead/acid batteries, each cored battery plate has a thin layer of lead at each side of the core. The lead may be at least partially oxidized to form a lead oxide surface if the cored battery plate is to be a positive battery plate. The lead surfaces of the cored plate may be surface treated so as to form a plurality of closely spaced depressions therein so as to thereby increase the exposed active surface area of the discrete plate. Ideally, the exposed active surface area of the discrete plate is at least 150% of the projected area of the plate.

It follows that the core element of cored battery plates of the present invention will serve the dual purposes or functions of being both a current collector element and a support element for the cored plate.

A further purpose of the present invention is to provide a cored structure where the core element may be any suitable conductive metal, against which thin layers of lead or other metal may be placed prior to their being surface treated.

Still further, the present invention provides a variety of steps whereby the interface of lead with the core material is so secure that there is no likelihood of delamination of the lead away from the core. It follows that the present invention will provide complex cored structures where a core element is clad with another metal in such a manner that delamination or even corrosion of the cladding material away from the core may be substantially reduced.

The present invention also provides a cored plate, where the inner core of the core element may be titanium, or it may be copper, beryllium-copper alloy, chrome vanadium steel, or even silver, having a titanium cladding. Particularly, if the core element is copper or other metal that is titanium clad, the cost of the cored plate may be effectively controlled and be economical.

Titanium is selected as a core surface material of choice because it demonstrates a high work function barrier height material, notwithstanding the possibility of passivation which may effectively isolate the titanium. However, the loss of effective core area and microdelamination which may come about as a consequence of passivation is negligible because of the poor corrosion propagation that may occur along a graded junction between lead and titanium. It should be noted, for example, that the Jet Propulsion Laboratory batteries noted above use an essentially non-conductive polymer core, rather than a conductive core, for their battery plates, but the battery performs well. Moreover, it has been found that a high tin content of perhaps 1% or slightly more of the lead which is immediately adjacent to the titanium interface will further control and essentially preclude the possibility of passivation.

A further object of the present invention will be to provide methods of plating titanium to a chrome vanadium steel or copper core; and particularly to clad or adhere lead to the outer titanium surfaces of the core, so as to provide a secure cored plate structure which is not subject to core delamination under operating conditions.

A still further object of the present invention is to ensure that graded junctions between the core and the cladding material may be controlled as to their crystallography. By these means, the profile of the interface between the cladding material and the core may be predetermined and closely controlled.

Still further, the present invention provides means whereby a further element or atomic species may be added during the manufacturing steps of providing the junction between the cladding material and the core, or even at the outer surface of the cladding material, for specific purposes such as corrosion control.

Indeed, the present invention further provides a manufacturing step that may be carried out in respect of conventional pasted plates for prior art batteries whereby such prior art plates, particularly those intended for use as thin plates, may be treated so as to reduce the likelihood of grid corrosion. The life of such prior art battery plates is thereby enhanced.

Finally, the present invention provides cored battery plates which will generally exhibit higher current carrying capabilities than previously has been attainable.

DESCRIPTION OF THE PREFERRED EMBODIMENTS

In its principal embodiment, battery plates are fabricated in keeping with the present invention for use in lead/acid batteries. Usually, each battery plate will exhibit a high active surface area when compared with its projected area. Moreover, the principal active constituent of each battery plate that is fabricated in keeping with the present invention is elemental lead or lead oxide, depending on its use as a negative plate or a positive plate. It has been noted, however, that the principles of the present invention may be applied to the fabrication of other cored plate structures.

Reference is made to four co-pending applications filed of even date herewith, each in the name of the present inventor. The first is in respect of an invention entitled "METHODS FOR FABRICATING BATTERY PLATES FOR LEAD/ACID BATTERIES", and relates particularly to methods by which thin layers of lead may be produced, formed, and surface treated so as to provide a battery plate having an exposed active surface area of the discrete plate unit which is at least 150% of its projected area. That application also provides methods for oxidizing lead surfaces in situ, whereby a pre-formed positive plate is provided without the necessity for post-forming the battery after it has been assembled.

The second application is entitled "BIPOLAR LEAD/ACID BATTERIES", and as its title indicates it is directed to bipolar lead/acid batteries. A number of the principles of the present invention are employed, insofar as there is a requirement in bipolar batteries to provide a cored plate—that is, a plate having back-to-back positive and negative electrode surfaces. Thus, in a bipolar plate opposite surfaces of the same plate have the opposite polarity, negative on one side and positive on the other, so that in a bipolar battery one side of the cored plate will have an active lead surface, whereas the other side of the cored plate will have an active lead oxide surface. Those particulars are one step beyond the present invention, whose purpose is to provide cored plates—especially battery plates—in general, whereby surfaces of other materials such as lead or lead oxide may be adhered to a metallic core without fear of delamination during active use.

The remaining two applications are entitled "INTEGRAL BATTERY ELECTRODE STRUCTURE FOR LEAD/ACID BATTERIES" and "INTEGRAL ELECTRODE STRUCTURES HAVING FILLER ADDITIVES". The first of those other applications relates to improved battery electrode structures which are otherwise as are generally found in the prior art at the time that these applications are filed. Certain of the ion bombardment techniques described herein find relevance also in the teachings of that application. The fourth application contemplates battery electrode or other electrode structures such as for fuel cells or electrolysis electrodes where a filler additive material is included in the metal electrode structure so as to provide added strength to the structure. The teachings of that invention may be useful in carrying out the present invention at that stage where additional substantially pure active surface material is placed on the cored plate surface, and especially where it is desired that there be increased mechanical ruggedness or increased resistance to corrosion of the active surface of the cored battery plate.

It has also been contemplated in a prior application Ser. No. 07/781,835 filed Oct. 24, 1991, also by the present inventor, that a thin layer of lead may be produced such as on a substrate of lead calcium or otherwise by a process identified as alloy migration sintering. The process comprises steps whereby a low melting point alloy which essentially comprises lead together with an alloying agent—usually tin—or a tin-coated lead powder, may be sintered. This is accomplished by forming a eutectic composition of the lead on the substrate, from which a sintered lead structure may be obtained.

In its ideal sense, because it functions as a current conductor—either as a current source or a current collector—an ideal battery plate should have negligible electrical resistance. Moreover, the ideal battery plate should have a very high ratio of exposed active surface area to its gross or projected area. Still further, of course, the bond between the chemically active material at the surface of the battery plate and any underlying material that functions as its physical support and/or its current collector should maintain both its mechanical strength and its electrical conductivity—with no localized high resistivity—under varying conditions including severe mechanical and/or electrical stress conditions.

Typically, the plate of a prior art lead/acid battery comprises a grid which is formed or cast from lead, and which supports an active paste. The lead of the grid may be alloyed with an agent such as antimony or calcium. However, as noted above, prior art plates are notorious for their demonstrated tendency to lose good contact with portions of the active material paste—which paste is forcibly placed into the voids formed by the grid. Moreover, the material of the grid may present some resistivity to current flow, and in any event the structure is heavy. There is therefore some likelihood of electrical resistance, and/or a mechanical fault resistance which may affect the ability of the plate to give up electrical energy in high discharge current conditions—or to absorb electrical energy in high charge current conditions. Those difficulties may be overcome by providing a high conductivity metallic core for cored battery plates in keeping with this invention.

For any battery plate, if there is an increased surface area of the active material of the plate, then there is a greater opportunity for energy transfer at the solid/liquid electrolyte/gas interface. That means, of course, that the battery will give up electrical energy as current, or accept electrical energy as current, at higher current rates. The matter of surface treatment to increase the surface area is fully described in the co-pending application relating to METHODS FOR FABRICATING BATTERY PLATES FOR LEAD/ACID BATTERIES.

In keeping with the principles discussed about, it is an intended design criterion of the present invention that the active material of the plates should be thin. This is the case whether the active material is on the negative plate or the positive plate—or the negative plate side or positive plate side of a bipolar electrode. As discussed, any attempt of prior art batteries to incorporate thin plates has, however, compromised the ruggedness of the battery and therefore its life. Moreover, an increased surface area will provide for a lower current density.

When the concept of structures such as cored battery plates is considered, as in the present application, it must be recognized that what is being discussed is the provision of a thin layer of lead over a core or substrate. Essentially, there are a number of means by which the thin layer of lead may be produced. They include the simple steps of casting a thin film of lead, or extruding a thin film of lead. However, thin films of lead are, themselves, difficult to handle, so a substrate such as a very thin sheet of lead calcium or lead antimony might be used. Indeed, other light weight materials which, themselves, would be substantially chemically inert in a battery might be used as a substrate. It is also recognized that placing lead layers on a substrate is relevant to cored plates in general, as well as with regard to bipolar battery plates. However, this discussion is also directed to battery plates which may be negative plates or positive plates, including plates which may be required to be used as end plates in bipolar batteries so as to provide equal numbers of facing positive and negative plates in a cell, as well as generally with respect to bipolar battery plates. In any battery, the plates are separated by an appropriate separator which will contain and effectively confine the acid electrolyte in the battery cell.

In any event, whenever a substrate or core is to be used for the preparation of the plate, its surface will be prepared, at least precleaning. As discussed hereafter, lead may be ion implanted into the prepared substrate surface, followed by plasma arc spraying. Control of the acceleration voltages of the plasma arc will be carried out using conventional techniques. Additional lead might, in fact, also be placed such as by sputtering lead onto the then placed first lead layer, or by co-extrusion.

Still further, the lead may be placed onto the prepared surface of a substrate using ion beam or neutral atomic beam implantation of lead ions or atoms onto the prepared surface. Similarly, because of the costs and control provisions of beam implantation, after the first lead has been placed there may be a follow-up plasma arc spray coat (or even sputtering) placement of lead onto the implanted atoms. Still further, simple flame spraying or charged atom deposition techniques may be employed to place lead or especially to increase the amount of lead emplacement on the prepared surface.

Indeed, it may be preferred for lead to be placed on the prepared substrate surface first by ion implantation—by which monatomic lead is placed on the substrate. Lead may then be further placed by plasma arc spraying, and if necessary by co-extruding, which may then permit alloying of the lead surface. At the same time, particularly with co-extrusion, surface treatment such as by the use of embossing rollers may be effected.

All of the above placement of lead onto the surface of a substrate has its intent to provide a graded junction between the lead and the substrate, by which a gradual concentration ranging from essentially pure substrate material to essentially pure lead, across the junction, will be obtained. Clearly, by removing the discrete chemical interface between the substrate and the coating, the opportunity for direct passivation of the substrate, and for corrosion of the plating, is significantly reduced. This is because the barrier height within the junction is not characteristic of either passivation or corrosion reactions. Therefore, the delamination between the lead coating and the core may be virtually precluded. This fact may be even further enhanced by the introduction of additional atomic species such as tin, antimony, or other additives that are well known to those skilled in the art.

Still further, more sophisticated environments may be provided by the introduction of gas suppression components such as cadmium, or even by high energy binding sites that may come as a consequence of the inclusion of fluorine, as alloying agents with the lead. Normally, the combination of fluorine and titanium is considered to be undesirable; however, when each is present in the range of about 100 p.p.m., the titanium fluorine bond will provide an effective corrosion stop by introducing into the junction area sites that have too high an energy level to be displaced by oxygen.

Further steps to even more preclude any possibility of delamination of a cladding material over a core, either by closer control of the profile of the graded junction due to time variation of accelerator voltage, or the use of additional "dopant" materials, are discussed in greater detail hereafter. Closely controlled graded junctions are particularly important, for example, in lead/acid batteries where there is a possibility of electrolyte penetration or invasion into the lead oxide positive surface. The problem may particularly occur when there is a tendency of the lead oxide to become sulphated—in other words, for lead sulphate to begin to form—because of the differences in their crystal structure and therefore the potential of crystal growth within the active surface structure. This gives rise to an unstable mechanical structure of the lead oxide active surface, in particular.

In any event, following any of the steps discussed above, the layer of lead may be further augmented by extruding yet a further layer of lead onto the already existing placed lead surface. This is then followed, as discussed above, by the surface treating steps, and still further by the oxidation steps as applicable.

As noted above, one principal object of the present invention is to provide a battery plate where most of the lead that is found in the plate is active lead. This assures that there is no additional weight due to the presence of unneeded lead. In order to satisfy that criterion, however, it is necessary that an appropriate current collector and support element be provided. Here, appropriate choices for a current collector are silver, copper or beryllium-copper, for their electrical and thermal characteristics; chrome vanadium steel for its economy as well as for its strength and thermal characteristics; and titanium for its appropriate electrochemical characteristics. Other suitable core element materials that may be chosen might include rhodium in the place of titanium, for example, or other chrome steels such as chrome steel, chrome molybdenum steel, and chrome steel alloys which include silicon as an alloying element. However, the choice of copper, any of the chrome steels, or even titanium, may lead to other difficulties. For example, it is difficult, if not previously impossible, to adhere or bond lead to titanium in a manner that the interface between the lead and the titanium will maintain its integrity under charge and discharge cycling, or under physical and electrical stress characteristics—such as elevated or very low temperatures, vibration, high current conditions, and so on.

Still further, care must be taken that the acid in the lead/acid battery is not permitted to gain access to copper or beryllium-copper alloy, if either is used. Not only will the acid severely destroy the physical integrity of the copper or alloy, there will be excessive gas generation within the battery as soon as the acid and copper contact one another. Thus, it is important to provide a structure whereby a copper or beryllium-copper core is protected by titanium cladding against the acid, and around the edges of the plate not only against the acid but so as to effectively seal the battery. Indeed, the same problems would prevail even if silver is used in the core.

Thus, so as to provide an ideal cored battery plate with thin lead layers and no excessive lead, the present invention particularly provides for the pre-formed core element to be comprised of a metal having low electrical resistivity. Ideally, that metal is copper, beryllium-copper alloy, chrome vanadium steel, silver, or titanium. However, where copper, beryllium-copper, or silver are used, they must be perfectly clad by titanium at the surfaces of the pre-formed core element which are to face the thin layers of lead at each side of the core.

The bonding or adhering of lead to titanium or the other chrome steels mentioned above, or titanium to a substrate such as copper, beryllium-copper, or silver, is another feature of the present invention, as discussed below.

It should be noted that the battery industry has previously tried to bond lead to titanium by first providing a titanium ceramic. However, a titanium ceramic is very brittle, so that its structural integrity may be jeopardized even while it is being handled.

What the present invention provides is a method to adhere lead to titanium or chrome vanadium steel or other chrome steels, or titanium to a copper, beryllium-copper, rhodium or silver substrate, by creating a gradual junction between the cladding material and its substrate.

The significance of the above criteria must now be discussed. First, as noted, the purpose of a cored plate is to provide a support for the lead or lead oxide active surfaces, and so as to provide a current path or current collector. In some cases, cored plates according to this invention will establish an effective temperature stabilizer which may be substantially isothermal. Several typical core materials have been suggested. Copper or beryllium-copper, for example, may be particularly useful when it is desired to provide temperature stability in a battery. The presence of copper will help to equalize temperature as well as current within the battery, preclude the likelihood of hot spots or temperature gradients developing in the battery, as well as to provide a low resistivity current path. In a stacked plate cell, or even in a conventional cell, current flow is along the plate and out the edge of the plate. In a bipolar cell, however, the current flow is through the plate from one side to the other. When the plates are cored plates, the core may contribute to better current handling properties for the plates. However, when the plates are in a lead/acid battery, the materials used in the core may be subject to attack by the sulphuric acid electrolyte.

Titanium and rhodium are immune to sulphuric acid. Copper, beryllium-copper, or even silver, will dissolve very readily and quickly if contacted by sulphuric acid. Also, chrome vanadium steel and, to some extent, the other chrome steels while being acid resistant may have a surface work function which is far too low, and therefore gas may evolve at their surfaces notwithstanding their acid resistant properties. On the other hand, as noted above, there may be some very good reasons for wishing to use copper or some of those other materials in the core, which reasons relate not only to current and heat conductivity characteristics but as well as to the expense of the material. Titanium or chrome vanadium steel have a higher electrical resistivity than copper, they are not as good heat conductors as copper, and titanium or rhodium are more expensive. However, as noted, titanium or chrome vanadium steel will not be attacked by sulphuric acid so as to dissolve in the acid, although gas may evolve if a chrome steel is used.

Titanium may be clad to copper by any cladding system or method such as plating, and so on, but a method provided by the present invention will permit cladding of titanium to other materials such as copper, beryllium-copper, chrome vanadium steel, or silver, and as well the same method will permit cladding of lead to titanium or chrome vanadium steel. Thus, the present invention provides methods for material cladding by which a graded junction of the cladding material to the substrate material will be provided so as to thereby substantially preclude any possibility of delamination of the materials under any conditions. In any event, what is provided is a cladded core by which the electrochemical system of the battery may be protected by precluding unwanted gas evolution, dissolution of core material into the acid electrolyte, by providing acceptable current handing and electrical resistance properties, and by providing temperature stabilization due to the presence of substantially isothermal plates.

Indeed, the present invention is applicable to bipolar lead/acid batteries by providing battery plates that permit current flow through the battery plate without the necessity of the use of pins or the like. Bipolar battery plates have generally been provided with polymer cores through which current collector pins extend. Those collector pins mean that there will be focused current through the plate at designated places, and that may result in temperature problems. Thus, cored plates in keeping with the present invention will find usefulness in bipolar batteries, as discussed in the referenced copending application relating to BIPOLAR LEAD/ACID BATTERIES.

In general, the placement of lead on titanium or chrome vanadium steel, or titanium on copper or chrome vanadium steel, for example, is accomplished by first creating a graded junction using ion implantation techniques. The ion implantation techniques may also include neutral atom embedment techniques. By these means, an ion or atom stream of the cladding metal is directed towards the surface of the substrate metal. The impact of the cladding metal on the substrate metal is important and is a function of the initial kinetic energy. Thus, the ion bombardment or neutral atom embedment characteristics, as a function of initial kinetic energy, may be controlled by controlling the acceleration voltage between the source and the target. Thus, with an initial high acceleration voltage, the ions of the cladding material, or the neutral atom embedment, will initially impact the substrate material and be deeply embedded thereinto. Then, the acceleration voltage may be gradually reduced so that there will be less impact and therefore a layer of implanted metal will be developed. Thereafter, there may be a plasma spray of the cladding material, or flame spraying or charged atom deposition of the cladding material. When the material being clad is lead onto titanium, then further lead may thereafter be co-extruded onto the, by then, exposed lead surface. By co-extruding lead onto the surface, a lead alloy can be put into place; it being understood, of course, that ion implantation itself is generally monatomic at any instant in time, for any one gun being used. Moreover, the use of multiple ion sources which can be switched sequentially will permit effective complex chemistry, as discussed in greater detail hereafter.

However, it must be clearly understood that when such as a lead to titanium graded junction has been established, that junction must not be permitted to be re-alloyed or otherwise disturbed. In any event, a usual procedure would be for about 200 atoms thick of ion implantation to first be placed of lead into titanium, followed by up to 2000 atoms or so of plasma torch cladding. Thereafter, a layer or multiple sequential layers of lead—which may be millions of atoms thick—may be extruded or cast onto the lower surface. Optionally, the relatively thin layer of lead, even if it is millions of atoms thick, may be placed by sputtering or flame spraying lead onto the lower surface. If an extrusion process is carried out, it must be at a relatively low temperature so as not to disturb the graded lead/titanium junction.

Indeed, after a lead surface has been established over a titanium substrate, or a chrome vanadium steel substrate, it is possible to anneal the lead surface; for example, such as by photon absorption from infrared sources. Thereafter, a further layer may be placed such as by plasma torch spraying or extruding, and then the structure may be annealed again at a lower temperature than previously. Thus, repetitive annealing steps may take place at ever decreasing temperatures as the thickness of the lead increases, until a substantially pure annealed lead surface—or at least a surface having a desired lead alloy composition, and a desired layer depth profile—is achieved. Surface treating steps, as discussed previously, may be carried out.

Moreover, the cored battery plate as it is now constituted following processes according to the preceding discussion may then be assigned for various purposes or uses. For example, the cored battery plates, having lead active surfaces at both sides, may be utilized as negative plates in lead/acid batteries. Or, following appropriate surface treatment and oxidation, the plates may be assigned for use as positive plates in lead/acid batteries. Still further, the opposed sides of the cored plate may be differently treated, so that one side of the plate is the negative plate and the other side of the plate is the positive plate in a bipolar battery.

Typically, the thickness of lead will vary depending on the use to which the plate is to be intended. For example, the thickness of lead cladding on the negative side of a bipolar plate, or on both sides of a cored plate intended for use as a negative plate, may be in the range of 0.5 to 1.0 mm. The positive side will have approximately 1.0 to 1.5 mm of lead cladded on the plate—or the positive side of the plate—which will subsequently be oxidized. Such values are typical for batteries which will be utilized such as for electric vehicle propulsion, when the batteries must accept and give up charge quite rapidly. Indeed, for batteries that are high use, low power, high energy density batteries such as those used for camcorders, laptop computers, and the like, the thickness of the active layers may only be 0.5 mm at each side of the plate.

Standards for the lead/acid industry at this time are generally such that plate thicknesses of 2.0 mm are considered to be thin, whereas plate thicknesses of 5.0 mm to 7.0 mm are considered to be thick. Indeed, under current industry standards, plates of 7.0 mm up to or exceeding 10.0 mm for standby batteries are to be found in the field. Batteries having cored plates according to the present invention, whether bipolar or stacked batteries, will as noted have very thin active layer thicknesses and reduced plate thickness. Even standby batteries in keeping with the present invention will have only 1.0 mm to 1.5 mm thickness of lead on the negative side, and 1.5 mm to 2.0 mm thickness of lead oxide on the positive side or on the positive plates. Thus, batteries having cored plates in keeping with the present invention are capable of being brought to the market and to the users with little or no excess lead, whereby almost all of the lead in the battery is usable.

In some circumstances, it may be desirable to alloy the thin layer of lead that is formed in the battery plates in keeping with the present invention. An agent such as calcium or antimony may, for example, be alloyed with lead as it is extruded onto the plate structure. It may also be desired that lignin, which is derived from Norway pine and which is used as an expander, may be sprayed onto the plates if needed. If so, the lignin would be dissolved in an organic solvent such as benzene or acetone.

There have been described thus far methods for fabricating cored structures such as battery plates for use in lead/acid batteries. Those battery plates may be positive plates or negative plates, or in keeping with the provisions of the co-pending application entitled BIPOLAR LEAD/ACID BATTERIES, the cored plates of the present invention may subsequently be treated for use as bipolar plates. In a particular embodiment, cored battery plates of the present invention which are intended for use in lead/acid batteries will have a core which, because of the exposure to sulphuric acid electrolyte, will either comprise titanium, or titanium clad onto a further high heat conductivity, low electrical resistivity metal such as copper. A graded junction is provided between the titanium and the lead, whereby the chance for delamination of the lead away from the titanium surface on which it is clad may be substantially precluded.

Further discussion now follows as to control of the profile of a graded junction between the cladding material and the core. As well, some discussion follows as to the use of additional "dopant" materials whereby phenomena such as delamination or corrosion, which may occur in the future while the battery plate or other cored structure according to the present invention is being used, may be effectively and substantially precluded.

The above discussion has included reference to the preparation of a graded junction by selectively altering the voltage being used during ion implantations procedures, over time. Ion implantation—or for that matter, plasma spraying—may be controlled as to the impact and depth of penetration of the cladding metal or atomic species by control at any instant in time of the accelerator voltage being used. Therefore, the profile of the junction between the cladding material and the core material may be controlled and altered.

Generally, in ion beam implantation or conventional plasma operations, the procedure is started with the highest voltage so as to provide the deepest implant of the cladding material into the core material. Such implantation will generally result in a low population density of the cladding ions. By reducing the accelerator voltage, later ion implantation is not subject to local capture re-heating. Thus, subsequent implants are essentially undisturbed so that the concentration gradient of the implanted ions should not be affected by localized or spot heating due to the impact of later implanted ions. Accordingly, carrying out such procedures by controlling the accelerator voltage from high to low will result in a profile which may be predetermined and reproducible.

An example of a bi-component structure which may be produced in keeping with the present invention, but which is not a battery plate, may be a vanadium steel part on which titanium is surface cladded. In the preparation of such a structure, the initial accelerator voltage may be in the range of 250 K.E.V. (Kilo Electron Volts), whereby initial ion implantation of several hundred atomic layers may be achieved. Heavy ions, such as titanium, having kinetic energy in this range will penetrate deeply, even into a dense and strongly bound core matrix. Then, progressively reducing the accelerator voltage while, at the same time, providing for longer exposure times, will result in an increase in the relative implant population as the depth of that ion implantation is decreased. By the time 50 K.E.V. accelerator voltage is reached, the implanted ion population should be just below the surface, and the cumulative implant population may be in the range of $10^{16}$ to $10^{17}$ or more atoms per square centimeter for typical applications. If the accelerator voltage is reduced to, say, 30 K.E.V., the procedure will result in surface deposition, and if the accelerator voltage is reduced somewhat below 30 K.E.V. there will be heavy surface deposition which is substantially equivalent to plasma spraying.

Clearly, however, in the event that there may be any damaged surface layers which might be spalled or dislocated due to initial high accelerator voltage ion bombardment, it may be necessary to repair such damage such as by annealing. By adopting annealing procedures early in the implant cycle, a resultant profile may be achieved which is an arbitrary superposition of the profiles of all of the accelerator voltages that have been employed, ranging from the maximum to the minimum accelerator voltages, where the resultant profile is also a function of or is "weighted" by the inverse rate of accelerator voltage change as a time function.

Accordingly, in keeping with the present invention, a controlled graded distribution of cladding material into and at the surface of the core material may be produced. This is distinct from the kind of relatively uncontrolled profile that may result from the use of a fixed accelerator voltage.

As described in the co-pending application entitled INTEGRAL BATTERY ELECTRODE STRUCTURE FOR LEAD/ACID BATTERIES, an improved lead/acid battery electrode structure may be accomplished simply by bombarding the surface of a prior art lead/acid battery lead plate with titanium. This is particularly useful, as noted in that co-pending application, if the titanium ion bombardment is made prior to the conversion of the surface of the lead plate to lead oxide. Indeed, the same principals apply to cored lead/acid battery plates, and cored bi-polar battery plates for lead/acid batteries that are produced in keeping with the present invention, especially if the implantation depth is somewhat greater than the conversion depth of the lead which will be converted to lead oxide. In that case, the thus produced positive plate will have a structure which will be longer lasting over a greater number of successive cycles, or even if it is used in a float circumstance in stand-by power applications.

The graded junction may be even further controlled by employing addition atomic species during ion bombardment procedures. For example, during the production of a cored plate such as the titanium or titanium clad core of the lead/acid battery plate, fluorine might be added at appropriate times during the ion bombardment procedures so that fluorine ions will be implanted in the lead/titanium graded junction. It is known that titanium has a high hydrogen threshold, but titanium may also be subject to passivation effects. It is also known that titanium fluoride ceramics are highly corrosion resistant, but they are too brittle to be used in most practical applications.

However, by introducing fluorine atoms into a lead/titanium graded junction, a propagation stop or barrier may be produced which may effectively preclude progressive development of lead sulphate in a lead oxide active surface. Even the smallest pinhole or crack may permit sulphuric acid electrolyte to invade the structure of the lead oxide active surface, and localized sulphation of lead oxide to lead sulphate may occur below the surface of the electrode. Thus, local lattice abnormalities in the lead oxide structure will develop. However, if fluorine atoms are introduced, a very localized titanium fluorine ceramic structure which is resistive to corrosion will be effected. Moreover, since fluorine has a higher chemical activity than that of, say, oxygen, a stable structure is accomplished.

Fluorine may be added to the graded junction between lead and titanium, for example, in somewhat lower concentrations of, say, $10^{12}$ atoms per square centimeter. This is accomplished by providing a depth profile for the fluorine which is graded from 100 K.E.V. to 30 K.E.V.

Thus, in keeping with other aspects of the present invention, graded junctions may be provided where a further atomic species is used as a dopant. The concentration of the cladding material over the core, and the concentration of the dopant in the junction structure, and their profiles, may be closely controlled. Such controlled surface structures having graded junctions or dopant loaded graded junctions find utility not only in respect of battery plates, but they also find utility in areas such as corrosion control in pipes and the interior surfaces of storage vessels and the like, as well as wear control on contact surfaces of moving parts such as gears, actuating levers, push rods, and the like.

It must also be particularly noted that the principles of the present invention may also be applied to conventional lead/acid battery plates as found in the prior art. In particular, the grids intended for use with conventional pasted plates may be implanted with, for example, titanium at densities of perhaps $10^{17}$ atoms per square centimeter plus or alternatively with fluorine at densities of $10^{12}$ atoms per square centimeter, prior to the grid being pasted. Such treatment will provide specifically for grid corrosion reduction, and accordingly thinner conventional battery plates might be produced.

Catalytic surfaces may likewise be prepared, and cladded sub-surfaces that may later have a further material deposited on them or be chemically converted—such as lead to lead oxide—are clearly applicable to the present invention.

It should also be noted that in the case of titanium being clad onto a core for use in lead/acid batteries, it may also be practical and desirable in some conditions to select a different substrate such as rhodium. Such selection may particularly be dictated by the use of a different electrolyte, or a modified electrolyte—for example, the addition of phosphoric acid.

As noted above, by the use of an additional atomic species to dope a graded junction, site availability for possible localized chemical reactions or cycling will be reduced. Thus, titanium may be alloyed during ion implantation procedures by adding other atomic species such as nitrogen or fluorine, whereby localized ceramic structures are effectively produced, where such ceramic structures are particularly resistant to corrosion—that is, they are particularly chemically stable in the presence of other ongoing chemical reactions such as electrochemical conversion of stored energy in a battery, or charging a battery, or corrosion of a material surface in the presence of an electrolyte or other agent which would promote corrosion activity. Moreover, repetitive annealing steps between successive layer deposition steps permits the interdiffusion of successive layers. Thus, the construction of a complex composition having clearly defined and controlled substrate profiles to optimize such parameters as corrosion resistance, while minimizing the content of costly additives, is achieved.

Finally, while it is outside the scope of the present invention to consider the charging of batteries in various service requirements, it must be noted that the battery charger, and the system comprising the charger and the battery, may be optimized so as to fully exploit the advantages of cored plate batteries. For example, where long series strings of batteries are provided for charging, the charging system would include provisions for balancing the voltage of the batteries so as to prevent the formation and evolution of differential battery states. Similarly, in long term stand-by battery systems, not only must the chemistry of the battery in terms of its plate and electrolyte composition be optimized, there must also be provided a charger environment which takes into account stratification, local inhomogeneities, dendrite growth within the batteries, etc. Even further, battery history, as well as the separator structure, the filled volume of the batteries, the case materials from which the batteries are constructed, and even the vent pressures at which the batteries will vent, may be considered and designed for. Thus, it is possible to exceed the performance limit of conventional designs by constructing and designing batteries and their chargers that will be optimized for a given requirement.

The scope of the present invention is defined by the appended claims.

What is claimed is:

1. A method of fabricating a cored battery plate for use in lead/acid batteries, where said cored battery plate comprises a core element having two sides, and with an active surface having a principal active constituent therein being placed at each side of said core element;

wherein the principal active constituent of said active surface is elemental lead or lead oxide; and where said method comprises the steps of:
 (a) producing a pre-formed core element;
 (b) producing a thin layer of lead at each side of said pre-formed core element;
 (c) forming a discrete plate unit having said thin layers of lead at each side thereof; and
 (d) surface treating said thin layers of lead;
wherein said pre-formed core element comprises titanium at each surface thereof, facing said thin layer of lead at each surface.

2. The method of claim 1, wherein said pre-formed core element comprises a low resistivity metal chosen from the group consisting of titanium, silver, copper, beryllium-copper alloy, rhodium, chrome vanadium steel, chrome titanium steel, and chrome molybdenum steel and chrome steel alloys which include silicon as an alloying element; and wherein when copper, beryllium-copper or silver, is used, titanium is clad over said copper, beryllium-copper or silver.

3. The method of claim 2, wherein step (d) is carried out on each thin layer of lead at each side of said pre-formed core element by one of the group of surface treating steps chosen from the group consisting of embossing and micro-machining with a laser.

4. The method of claim 1, wherein, when said cored plate or one surface of said cored plate is to be used as the positive plate in a lead/acid battery, said method further comprises the step of:
 (e) oxidizing at least a portion of the thin layer of lead on at least said surface of said cored plate element which is to be used as the positive plate, so as to form a lead oxide coating as the active surface thereon.

5. The method of claim 2, wherein titanium is clad onto said copper, beryllium-copper, silver, or chrome vanadium steel.

6. The method of claim 1, wherein lead is clad on one of said titanium or said chrome vanadium steel, said chrome titanium steel, or said chrome molybdenum steel, in the first instance by ion implantation techniques.

7. The method of claim 6, wherein said ion implantation techniques are followed by further placement of lead on said titanium or said chrome vanadium steel, said chrome vanadium steel, or said chrome molybdenum steel, by at least one of the steps chosen from the group consisting of plasma arc spraying, low temperature extruding, sputtering, flame spraying, and casting.

8. The method of claim 7, where, when substantially pure lead is being placed on a previously placed layer of lead, said plate structure is annealed.

9. The method of claim 8, followed by repeated steps of placing further lead and annealing the structure at ever decreasing temperatures as the thickness of lead increases until substantially pure annealed lead surfaces are achieved.

10. The method of claim 9, where the composition of each successive layer of lead as it is placed may differ from prior layers of lead that have been placed.

11. The method of claim 2, wherein, when said cored battery plate is to be used as a bipolar lead/acid battery plate having an active lead surface at one side thereof and an active lead oxide surface at the other side thereof, said pre-formed core comprises titanium at the outer surfaces thereof.

* * * * *